United States Patent Office 3,158,546
Patented Nov. 24, 1964

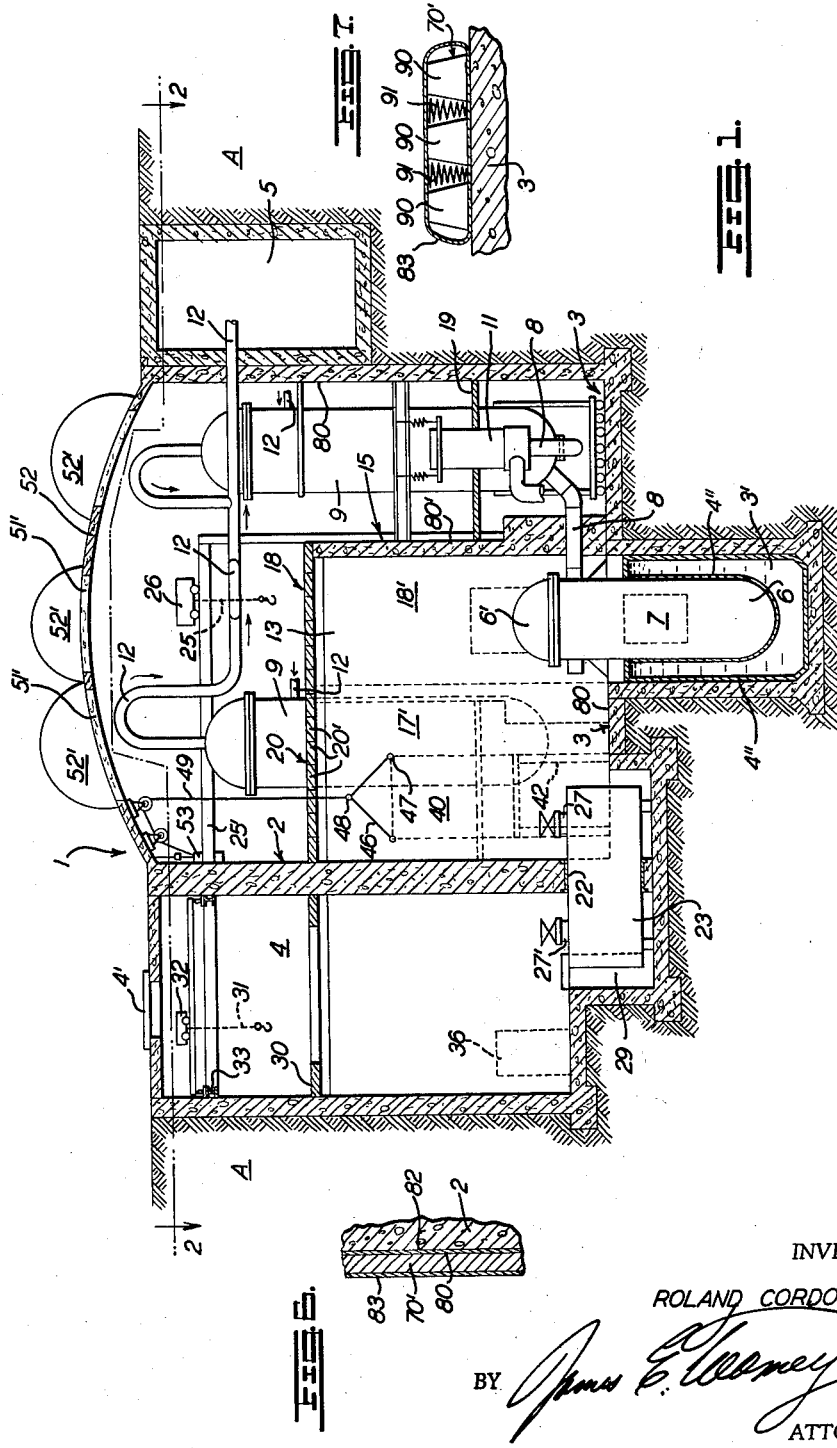

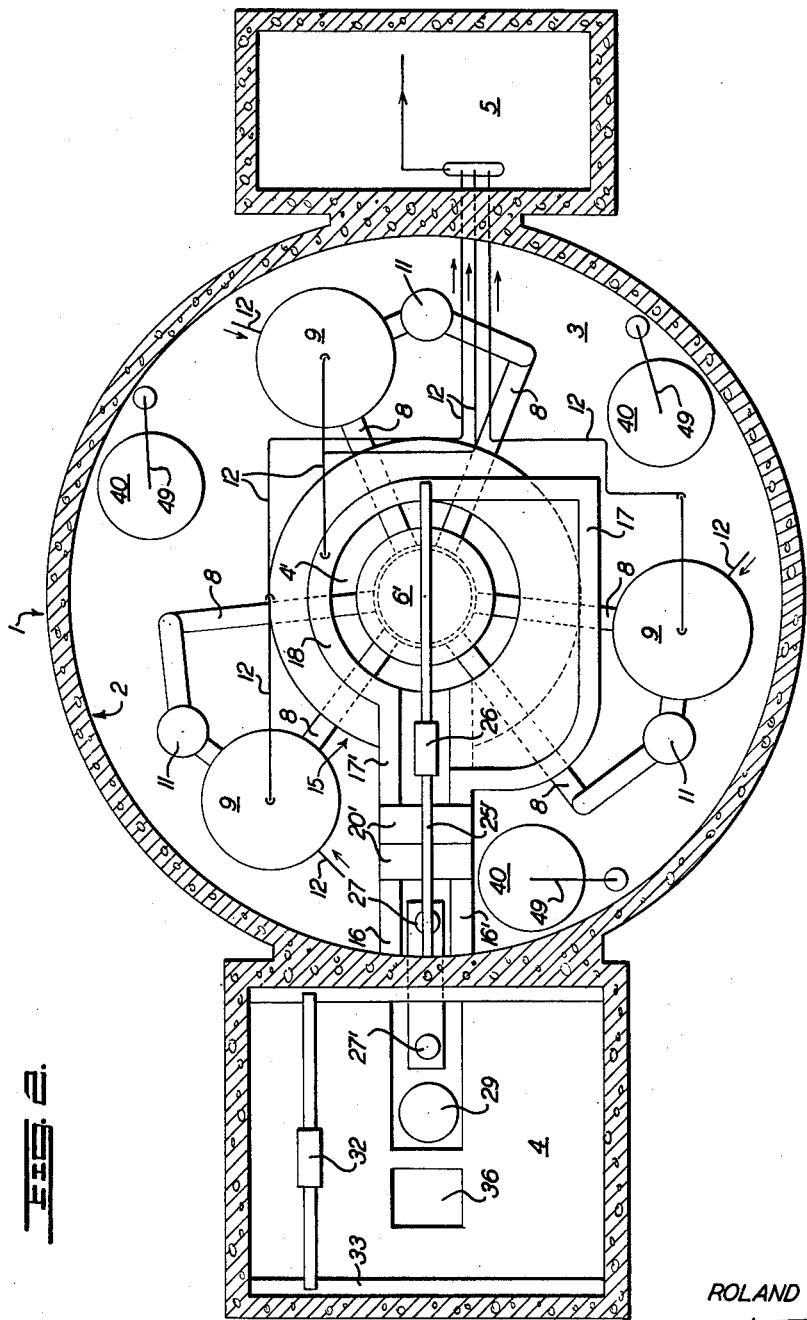

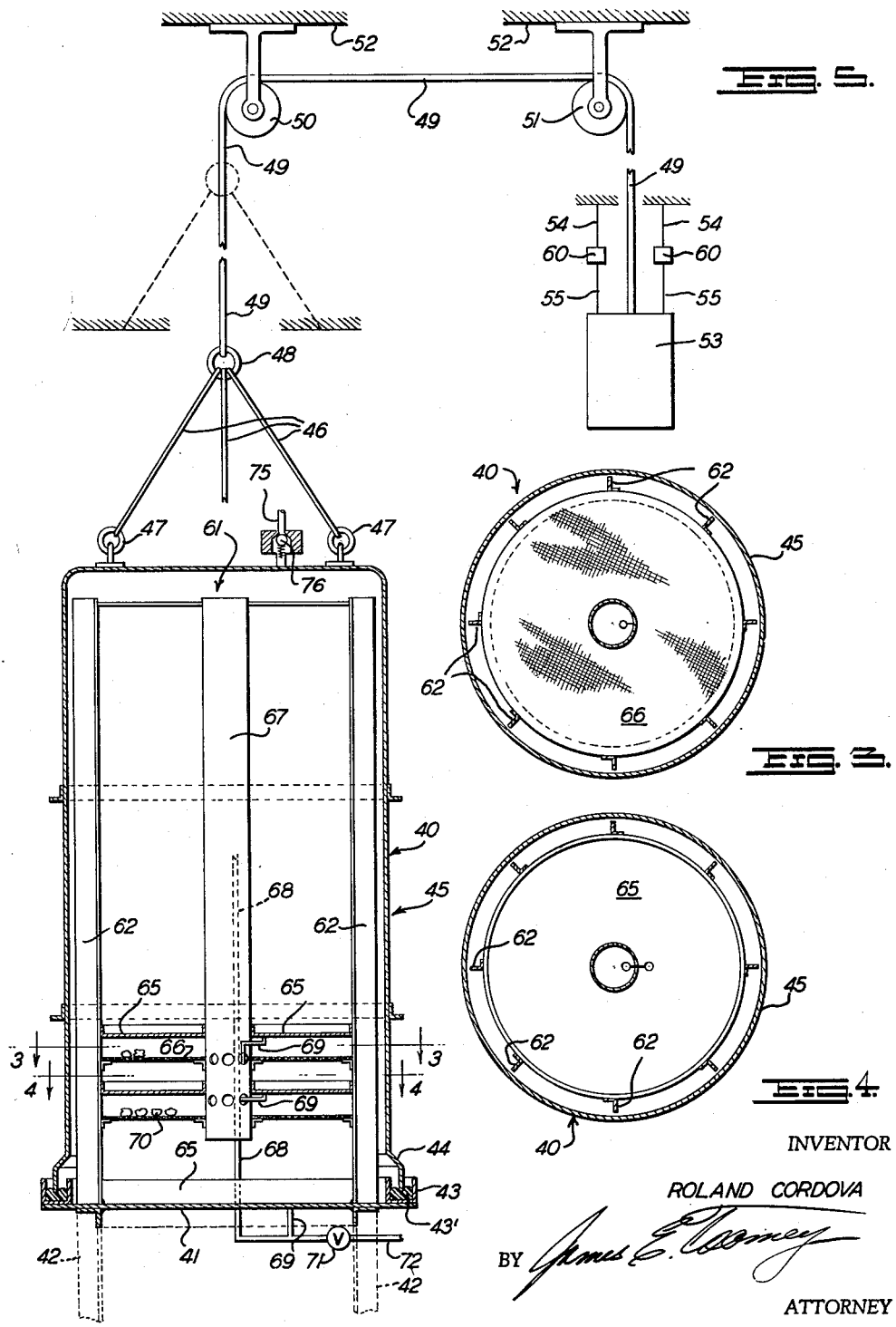

3,158,546
NUCLEAR REACTOR CONTAINMENT METHOD
AND APPARATUS
Roland Cordova, Lafayette, Calif., assignor, by mesne
assignments, to Kaiser Industries Corporation, Oakland,
Calif., a corporation of Nevada
Filed Oct. 21, 1960, Ser. No. 64,085
9 Claims. (Cl. 176—37)

This invention relates to a method and apparatus for the suppression of explosions. More particularly, it is concerned with a novel method and apparatus for the containment within a containment vessel of radioactive materials and for preventing excess build-up in pressures in the containment vessel upon the liberation in a nuclear reactor device of part of all of the contents of what is known in the nuclear reactor art as the primary loop.

In the ordinary nuclear reactor power stations or propulsion units which have been constructed to date, the entire nuclear reactor assembly is usually housed in a gas-tight containment chamber or vessel whereby the normal yet negligible amount of radioactivity which occurs during use of the nuclear primary loop does not escape into the atmosphere. The pressure within this containment chamber is advantageously maintained at a slightly negative pressure so that any air leakage that might occur is toward the interior or into the containment chamber rather than outwardly of the chamber and toward the atmosphere.

The nature of these containment chambers or vessels is such that they require exceptionally thick walls made of reinforced or prestressed concrete and/or steel and large interior volumes in order to properly contain within the chamber the pressures and radioactive materials liberated, for example, as a result of a rupture or leak in the nuclear primary loop. Because of the exacting design requirements for these containment structures, such as wall thickness, interior volumes, etc., these structures are most expensive. This expense has discouraged and hampered the widespread utilization of nuclear reactors for electrical power purposes and/or as the primary propulsion source for various types of vehicles and vessels except where the funds have been made available through governmental agencies.

Accordingly, it is a primary purpose of the instant invention to provide an economical, simple, efficient and reliable method and apparatus for use in the containment within a nuclear reactor containment chamber or vessel of radioactive gases and/or liquids that are liberated under high pressure accidentally or otherwise from the primary loop of a nuclear reactor assembly. By use of the method and apparatus of the instant invention the gases and/or liquids liberated from the primary loop of a particular nuclear reactor installation will not only be for all practical purposes wholly absorbed and contained within the containment chamber but they will also be prevented from building up into excessive and unsafe pressures and temperatures. The pressures and temperatures will also be maintained within the predetermined safe ranges established in the normal design of the particular reactor installation involved.

One advantageous embodiment of the invention contemplates that the means which is provided for preventing the development of excess and dangerous pressures and temperatures of the liberated liquid and/or gases is of such a nature that it can deteriorate and be collected along with the liquid and/or gases which have been reduced to a liquid in conventional liquid handling equipment.

Other purposes and advantages of the instant invention will be more fully understood by reference to the following detailed description when taken in conjunction with the appended drawings wherein:

FIG. 1 is an elevational sectional view of a nuclear reactor installation and discloses in somewhat diagrammatic form the general arrangement of the nuclear reactor containment vessel, the nuclear reactor pressure vessel, steam-producing means or generators, pumps and other apparatus associated therewith;

FIG. 2 is a plan sectional view generally taken along the line 2—2 of FIG. 1, with parts added and other parts removed for the sake of clarity, and discloses in more detail a typical assembly for the nuclear reactor primary loop circuit;

FIG. 3 is a plan sectional view taken generally along the line 3—3 of FIG. 5 with parts removed;

FIG. 4 is a plan sectional view taken generally along the line 4—4 of FIG. 5 with parts removed;

FIG. 5 is a sectional view of a cage-like receptacle and associated apparatus for various chemical compounds or substances which serve as a means for absorbing and thereby containing and maintaining within acceptable limits the pressures in the nuclear reactor containment vessel upon the liberation of liquids and/or gases in the nuclear reactor primary loop circuit;

FIG. 6 is a fragmentary sectional view of a modified portion of the apparatus shown in FIG. 1; and FIG. 7 is a fragmentary sectional view of a further modified portion of the apparatus shown in FIG. 1.

With further reference to the drawings and in particular FIG. 1, which is merely illustrative of one nuclear reactor environment to which the teachings of the instant invention are applicable, this nuclear reactor device generally comprises a containment vessel or chamber 1. The major portion of the vertically arranged, cylindrical containment vessel 1 is disposed below grade level in the earth A.

Vessel 1 comprises an outer wall 2 advantageously made of reinforced or prestressed concrete and/or steel. The vessel is provided with a stepped annular bottom 3 likewise made of concrete and/or steel.

Associated with the containment vessel 1 is a secondary vessel or spent fuel pit 4 which will be discussed more fully hereinafter.

In the device shown, a further secondary opening or pit 5 is associated with the containment vessel 1 and this pit 5, as will be described more fully hereinafter, is used primarily for the purpose of locating various containment vessel penetrations and vessel maintenance equipment including regulating valves, control instruments, etc. ordinarily required for proper maintenance and operation of a nuclear reactor installation.

Centrally disposed within the floor 3 of the containment vessel 1 is a depression 3'. Located within depression 3' is a neutron shield tank 4" containing water within which the usual nuclear reactor pressure receptacle or vessel 6 is suitably mounted by means not shown. This receptacle 6 contains the nuclear core material 7 into which the conventional nuclear fuel rods or elements (not shown) are inserted. The core material 7 can be surrounded by a liquid used as the moderator and/or coolant for the core material 7 or it can be surrounded by a gas used as the coolant and water or various solid materials used as the moderator. In the device shown in FIG. 1, it is contemplated that water be used as the moderator and coolant. This water enters and exits from the receptacle 6 through the medium of the primary loop or conduit means 8 part of which is disposed within one or more conventional steam-producing means or generator vessels 9.

Any number of steam generator vessels 9 and primary loops 8 can be used depending upon the results desired. In the installation shown, three such vessels 9 and one primary loop 8, which includes three circuits, are shown. The water in the primary loop 8 is maintained under a constant predetermined pressure by means of a conventional pressurizer (not shown) and pumps 11 which cause the water to circulate in the primary loop circuits and through steam generator vessels 9 and reactor receptacle or vessel 6.

The water surges through the primary loop 8, pumps 11 and vessels 9 which contain the conventional heat exchangers (not shown) and the conventional secondary and interconnected loop conduits 12. When the water in the secondary loop conduits 12 is heated in the manner conventional in this art, it passes from the vessels 9 in the form of steam which is then transferred to any device used to perform work such as a steam turbine.

With further reference to the drawings and in particular FIGS. 1 and 2, it will be observed that the lower portion of the reactor pressure receptacle 6 is disposed in the neutron shield tank 4″ located in depression 3′ in the floor 3 while the upper portion thereof, which is connected to the primary loop 8, is mounted within a fueling pit assembly 15. The fueling pit assembly 15 can advantageously take the form of a housing or canal which projects inwardly from the outer wall 2 of the containment vessel 1 and adjacent the spent fuel pit 4 until it terminates in the central interior part of vessel 1 above the reactor receptacle 6.

More specifically, as indicated in FIG. 2, housing 15 is comprised in part of a portion of the wall 2 of the containment vessel 1, intermediate upstanding wall portions 16, 16′ 17 and 17′. Spaced wall portions 17 and 17′ are interconnected by means of an upright wall portion or shell 18. Wall portion 18 surrounds the upper part of receptacle 6. The inner chamber 18′ formed by wall portion 18 in effect forms a continuation of depression 3′ or pit 3′. All of the wall portions of housing 15 are usually made of concrete to serve primarily as biological shielding for the nuclear reactor core 7. Conventional service catwalks or gratings 19 are mounted intermediate wall 2 and housing 15 and the top 20 of housing 15 can comprise a series of removable concrete deck lids or covers 20′.

The lower portion of the wall 2 of the containment vessel 1 adjacent the housing 15, which effectively seals off the receptacle 6 and its contents from the interior of vessel 1, is provided with an opening 22 within which is disposed a nuclear spent fuel element transfer tank 23. The walls of the spent fuel transfer tank 23 are securely sealed within this opening 22 by the usual sealing elements and techniques employed in the nuclear reactor art whereby the spent fuel pit 4 is effectively sealed off from the interior of housing 15 and the interior of vessel 1.

The purpose of the spent fuel element transfer tank 23 is as follows. When the reactor needs refueling, the bolts or other devices holding the reactor vessel head 6′ to the main body of the reactor receptacle 6 are removed, it being understood of course that the reactor will have been shut down in the meantime and the interior of housing 15 flooded with water by suitable means (not shown) after the bolts are removed. An operator standing on the top of wall portions 16 or 16′, 17 or 17′ from which the lids 20′ have been removed operates a suitable grappling device (not shown) carried by a hoist 25 suspended from refueling crane 26 disposed on trackway 25′ above the housing 15. The grappling device is used to lift the top head 6′ and selected components from the reactor receptacle 6 and then to selectively withdraw the spent fuel rods (not shown) from the core 7. After removal from core 7, the spent fuel rods are transferred to and lowered by the grappling device and crane 26 through the valved opening 27, the valve having been moved in the meantime to an open position, and into the right-hand portion of the fuel transfer tank 23 as shown in FIG. 1.

After the operator in the containment vessel 1 removes the successive spent fuel elements and places them on a suitable transfer device (not shown) in the transfer tank 23, the transfer device not being shown since it does not form any part of the instant invention, the transfer device acts to transfer the spent fuel elements from the right-hand portion of the fuel transfer tank 23 through the wall 2 and tank 23 and into the left-hand portion of the fuel transfer tank 23.

During the time an operator is working in the main containment vessel 1, a second operator is working in the spent fuel pit 4. This second operator can stand on the service catwalk 30 in pit 4. The operator in pit 4 controls a grappling device (not shown) suspended from the hoist 31 carried by crane 32 the latter of which is suitably mounted on trackway 33 above pit 4. Crane 32 lowers the grappling device through the water below catwalk 30 and into the valved opening 27′ on the left-hand side of tank 23, the valve for opening 27′ having been opened in the meantime. The spent fuel elements are selectively removed from time to time from the left-hand portion of tank 23 by the operator in pit 4 by means of the grappling device and transferred to conventional spent fuel racks 36 within the water located in the lower portion of the spent fuel pit 4 where they are maintained for several months until they decay to the point where they can then be loaded into a shipping coffin 29 by the grappling device. The shipping coffin is withdrawn at the appropriate time and by appropriate apparatus through the hatchway 4′ for the pit 4.

The nuclear reactor device described thus far involves more or less conventional equipment.

As indicated above, one of the major problems involved in a nuclear reactor installation is the maintaining of control of the radioactive liquid and/or gases in the primary loop 8 which may be liberated within vessel 1 accidentally or otherwise. These gases and/or liquids, unless controlled, will immediately upon liberation causes the development of extremely high pressures within the containment vessel 1, the possible rupture thereof, dissipation of radioactive products into the atmosphere and a consequent contamination thereof. The extremely simple, efficient and very economical expedient proposed herein for preventing all of this is far superior to the various schemes which have been devised to date such as, for example, the use of large-size and expensive containment vessels.

This expedient involves using one or more chemical substances and in particular chemical substances having at least hygroscopic properties. These chemical substances may be inorganic or organic. Examples of inorganic chemical substances are potassium bromide, potassium thiocyanate, sodium chromate, sodium sulfide and strontium hydroxide. Each of the particular chemical substances listed above as well as others also exhibit endothermic properties in that such a substance takes up or absorbs water or other gas or liquid with absorption of heat and will thus supply a potential source for the condensation of additional quantities of gases, steam or water vapor because of such heat absorption. Thus, the use of such a chemical substance either alone or in admixtures will, when used in sufficient quantity to absorb the pressure causing gas, water vapor or steam at a rate commensurate with the rate at which the liquids and/or gases are being liberated from the nuclear primary loop, prevent excessive pressure rise in a contained volume that would otherwise be caused by the gas, water vapor or steam.

Accordingly, in a further preferred embodiment of the instant invention it is contemplated that the chemical substance used have endothermic properties in addition to being at least hygroscopic.

Another advantageous embodiment of the invention contemplates that the chemical substance used have deliquescent properties in addition to being hygroscopic. A deliquescent chemical substance has the property of absorbing water in the vapor phase from the air and of liquefying in the absorbed water.

Examples of organic chemical substances which can be used in practicing the instant invention are cyanoethanoic acid; trichloroacetic acid; 1,3,5-benzenetrisulfonic acid; and p-chloro-benzenesulfonic acid. The aforesaid acids exhibit deliquescent properties.

As the deliquescent chemical substance liquefies, it can then be advantageously collected by gravity and pumped into a recovery system in which the water is removed and the chemical substance crystallized and recovered. In the meantime, of course, the radioactivity as well as other impurities will have been removed from the chemical substance whereby the chemical substance can then be handled without any danger to human life.

Reservoirs of these chemical materials or substances can be stored in any number of ways and in various types of sealed receptacles whereby they would be isolated from the normal inner atmosphere of the containment vessel until they are needed.

It is to be understood, of course, that the particular chemical substance used will also dictate the materials to be employed in making the receptacle for the chemical substance so that the material from which the receptacle is made will not react unfavorably with the chemical substance disposed in the receptacle such as corrosion of the receptacle parts or deterioration of the chemical substance.

A wide variety of control means can be employed for breaking the seals of the receptacles so that chemical compounds or substances can be immediately removed from isolation or deisolation and exposed to the interior atmosphere of the containment vessel 1 at the desired time.

For illustrative purposes only, several receptacle arrangements for isolating and storing the appropriate chemical compounds such as those noted above in a ready condition are shown, particularly in FIGS. 3–7.

With further reference to the drawings and in particular FIGS. 1–5, one of these receptacle arrangements involves the use of a cage-like receptacle 40. Although three such chemical receptacles 40 are disclosed in the instant invention, it is obvious that, depending upon the results desired and the size of the reactor, any number can be used. Moreover, these receptacles 40 can have various shapes, configurations and dispositions within the containment vessel 1. In any event, however, they should be of such a nature and construction that substantially immediately upon the release or liberation of a part or all of the contents of the nuclear reactor primary loop 8 the chemicals which are contained in the receptacle 40 will be substantially immediately exposed to the atmosphere within the containment vessel 1 and the liberated contents of the primary loop 8.

The particular receptacle 40 disclosed in FIGS. 3–5 is generally comprised of an annular base or bottom member 41 which is anchored by means of the stanchions 42 to floor 3 of the containment vessel 1. The outer periphery of the base member 41 is provided with a channel shaped annulus 43. Annulus 43 contains a suitable sealing element 43' such as heavy mineral oil or a resilient rubber or plastic material. Removably seated within this channel shaped annulus or sealing ring 43 is the bellmouthed portion 44 of the sealing skirt or hood 45. The hood is connected at the upper portion thereof by means of straps 46 and bales 47 to a ring 48. Looped to ring 48 is one end of a cable 49 which passes over the pulleys 50 and 51 mounted in the roof or top 52 of the containment vessel 1. Roof 52 is provided on the outside with the sealing bubbles 52' for the conventional hatchways 51'.

The cable 49, which can be steel, is provided with a lead counterweight 53. The counterweight 53 is maintained in a fixed position with respect to the roof 52 of the containment vessel 1 by means of the wire links 54 and 55. Wires 54 and 55 are connected to each other and to counterweight 53 by means of conventional heat-melting links, pressure actuators or radioactivity-sensing elements 60.

Sealing skirt 45, when at a position of rest, surrounds the cage-like assembly 61 mounted on the base 41. This cage-like assembly 61 comprises a plurality of circularly arranged upright legs 62 affixed to base 41. These legs 62 form supports for a plurality of doughnut-type collection pan elements 65 and a plurality of foraminous shelf elements 66 which are interspersed or interdigited between the pan elements 65. Only a few of pan elements 65 and shelf elements 66 are shown in FIG. 5. Pan elements 65 and shelf elements 66 surround a centrally disposed flue-type structure 67 within which is disposed an outlet manifold pipe 68. Outlet manifold pipe 68 is connected by means of various branch lines 69 to the individual collection pan elements 65.

The foraminous shelf elements 66 perform a dual function. They assist in exposing the maximum surface area of the chemical compounds 70 disposed on the shelves to the inner atmosphere of containment vessel 1. Secondly, when the compounds 70 are deliquescent materials, the foraminous or perforated shelf elements 66 allow the liquefied compounds to flow onto collection pans 65. From pans 65 the deliquescent compounds pass through branch lines 69 and manifold pipe 68 through gate valve 71 to conduit 72 leading to a suitable collection tank (not shown).

The bellmouthed portion 44 of the sealing skirt 45 is normally maintained in a sealed relation with respect to base 41 by virtue of the sealing material 43' disposed within annulus 43. During normal operation of the nuclear reactor device, the sealed receptacle 40 can advantageously contain an atmosphere of an inert gas such as nitrogen. The inert gas will be at a pressure slightly above the ambient pressure within the containment vessel 1 during normal opeartion of the reactor device. In this way, the chemical substances are assured of being in the "dry" state and available for instant and maximum use. The gas can be injected into the receptacle 40 through the port 75 containing a one-way pressure operated ball-type valve 76.

From the above description, it will be readily seen that when the liquid and/or gas contents of the primary loop 8 are liberated within the containment vessel 1 and effect an immediate increase in the temperatures and pressures within the containment vessel 1 the following sequence of events will take place. The preset sensing devices 60 referred to above will immediately break the connection between linking elements 54 and 55 and allow the lead counterweight 53 to drop. As counterweight 53 drops, it will pull sealing skirt 45 away from the sealing element 43' in annulus 43 and expose the chemical compounds 70 mounted on shelves 66 to the liberated liquid and/or gas contents of primary loop 8.

It is to be understood of course that the amount and disposition of the same within and for any given containment vessel volume will be such that it will present sufficient surface area to absorb the pressure inducing and liberated fluids, i.e., liquid and/or gas from primary loop 8 at substantially the same rate or commensurate with the rate at which the liquid and/or gas is liberated from loop 8. In fact, in most instances a safety factor will be involved whereby the amount of chemical compounds used and the amount of their exposure will be well above the critical limits anticipated for any given nuclear reactor installation.

FIGS. 6 and 7 show modified receptacle arangements for the chemical substances used in the instant invention whereby reservoirs of the substances will be maintained in a ready state for instantaneous use. In lieu of a specially designed receptacle such as that described above, the invention contemplates that the chemical compound in the form of coatings, beds, slabs, cones, blocks, built-up layers or linings can be applied directly to the interior surfaces 80 of the wall 2 or bottom 3 of the containment vessel 1 or to the exposed surfaces 80' of the wall portions of the housing 15 and top 52 and/or to any suitable exposed surface of any of the apparatus such as steam generating vessels 9 located within the containment vessel 1.

FIG. 6 shows a typical application of the chemical compound to an exposed wall surface 80 of the wall 2 within the containment vessel 1. The chemical compound indicated by the reference number 70' can be advantageously applied in the form of a coating, slab, block, built-up layer or lining to a sealant coating or topping 82 previously applied to the inner surface 80 of wall 2 to make surface 80 for all practical purposes impervious.

Compound or substance 70' is isolated from the normal inner atmosphere of vessel 1 by means of the envelope or isolating membrane 83. Isolating membrane or envelope 83 is advantageously made of a destructible compound, the membrane being substantially completely destructible upon a predetermined increase in temperature and/or pressure over those normally present within containment vessel 1 during the normal operation of the nuclear reactor installation.

Examples of suitable chemical substances 70', sealant coatings 82 and isolating membranes 83 are as follows. The substances 70' can be any one of the inorganic or organic substances noted above. The sealing coating 82 can be a water repellent compound consisting of pulverized iron combined with oxidizing chemicals and sold under the trademark "Ferrokote" by the Ceresit Waterproofing Co. of Chicago, Illinois. The sealant coating 82 can also be a nonshrinkable, crack-free, impermeable plaster such as that sold under the trademark "Embeco No. 5" by the Master Builders Co. of Cleveland, Ohio. The isolating membrane 83 can be a low-melting plastic or metal alloy system. One such metal alloy system contains 32.7% lead, 11.3% tin, 8.5% cadmium and the remainder bismuth. This alloy system melts in the range of 158° F. to 194° F. By varying the composition, the desired melting range and sealing properties for any given nuclear reactor installation can be obtained.

FIG. 7 discloses an arrangement where the compound 70' comprises one or more self-supported blocks or individual masses 90 of the compound 70' separated from one another by suitable spacer elements such as spacers 91. These blocks 90 can be randomly arranged singly or in groups throughout the interior of the containment vessel 1. One or more blocks can be completely enclosed within sealing envelope 83 made in accordance with the low-melting alloy system noted above with envelope 83 and blocks 90 being disposed on some convenient part of the floor 3 of vessel 1 and outside of housing 15.

The advantage of using chemical substances 70' in the form of slabs, coatings, layers, liners, etc. is that the substances can be readily made to conform to the specific configurations and contours of different wall surfaces such as the interior wall surfaces of the containment vessel 1 itself or any suitable, exposed wall surfaces of any of the apparatus located in vessel 1. This in turn means that the coatings, liners, etc. can be advantageously used where the amount of available interior installation areas in the containment vessel 1 for the substances is at a premium.

During the time that the chemical compounds are performing their function, a suitable audio and/or visual alarm system (not shown) will also have been set off whereby the installation operator may then proceed to shut down the nuclear reactor installation completely. Such an alarm system can also be fully automatic so that all necessary functions for "scramming" or shutting down the reactor transpire quickly and automatically.

The instant invention is particularly useful upon the occurrence of what is known in the nuclear reactor art as a "maximum credible accident condition."

Although a maximum credible accident condition has been defined in various ways in the leading nuclear reactor literature, it is believed that the following is an acceptable definition for the purposes of this application:

A maximum credible accident condition is one wherein an event or a series of events which are deemed credible for a specific nuclear reactor installation transpire to provide a normally uncontrolled release of part or all of the nuclear reactor primary loop contents.

An example of the use of the method and apparatus of the instant invention with a specific pressurized water reactor with specific design conditions is set forth below. It must be remembered that although the following is a specific example many other types of nuclear installations and other types of reactors including Boiling Water Reactors can advantageously use the herein disclosed invention. By a pressurized water reactor is meant any of those discussed in "Advanced Pressurized Water Reactor Study," TID 8502, (Pt. 1), issued July 1959 by The United States Atomic Energy Commission.

*Containment Vessel Design Criteria*

(1) Pressurized Water Reactor to produce 510 thermal megawatts of heat—steam equivalent to the generation of approximately 150 net electrical megawatts.

(2) Geometry of containment vessel—cylindrical concrete structure—the major part of which is below grade—60 ft. diameter inside dimension by approximately 60 ft. over-all height.

(3) Total inventory—primary loop—3100 cubic ft. of water at average temperature of 535° F. and average pressure of 2150 p.s.i.g. Small volumes of steam are ordinarily present in the primary loop. However, these steam volumes are not taken in account for the purposes of this example because they have no substantial effects on the results.

(4) Maximum average ambient temperature within the containment vessel prior to the liberation of water from the primary loop is equal to 125° F.

*Calculations*

The total energy stored in the primary loop and available during the maximum credible accident condition is $76.8 \times 10^6$ B.t.u. plus 10% stored energy in core and other components within the containment vessel, the latter of which is equal to 10% of the energy given above. Hence, total stored energy is $84.5 \times 10^6$ B.t.u. Upon liberation, the contained water of the primary loop will flash into steam into an initial atmosphere within the containment vessel which for the purposes of this example would be held at approximately 14.6 p.s.i. absolute. The design of the containment vessel is for a maximum pressure of 13 p.s.i.g. or 29.8 p.s.i.a. Upon the conditions given above, it is calculated that of the total water within the primary loop of 145,000 lbs. a total of approximately 60,000 lbs. will flash into vapor and into containment vessel atmosphere.

Based upon available standard handbook data, it is calculated that one cubic foot of the chemical potassium thiocyanate (KCNS) will absorb and condense approximately 3.2 cubic feet of water per lb. This chemical can be in the form of extremely fine powder and increase in size to large crystals. This rate of absorption is substantially immediate. Based upon the amount of steam flashed and the capacity of absorption and/or condensation of the specific chemical KCNS, it is estimated that 326 cubic feet of this chemical would absorb the steam released upon the occurrence of the maximum credible accident condition.

As noted in the above example, the specific substance that is used is one in which an energy balance between the released energy from the primary loop and the condensation and absorption rate of the substance is readily effected. Further, the use of a specific substance for a specific energy balance, as given above, will be determined by the properties of the substance, its availability and cost.

To illustrate the economic advantages of the instant invention, upon designing the containment vessel to withstand a maximum pressure of 13 p.s.i.g. and when using the substance, a volume need be provided only to accommodate the physical arrangement requirements of the specific installation. In the above example, a prestressed concrete cylindrical structure measuring approximately 60 ft. in diameter and 60 ft. in height is suitable. To contain this pressure by the methods used in the past, a vessel volume approximately 15 times greater than the above would ordinarily have to be provided. For comparison, this volume would be ordinarily contained in a cylindrical structure approximately 120 feet in diameter and 200 feet high. The use of steel and/or concrete for such a structure would be extremely expensive. Moreover, since such a structure would for the most part have to be placed above ground instead of below ground, the safety factor involved in the use of such a structure would be greatly reduced.

An advantageous embodiment of the invention has herein been disclosed and described. It is obvious that various changes and modifications may be made therein without departing from the spirit and scope thereof defined by the appended claims wherein what is claimed is:

1. Within a closed nuclear reactor containment first vessel, said first vessel provided with a pressurized second vessel separately encasing a reactor core, a method for containment of fluids carrying radioactivated material accidentally liberated within said containment first vessel, comprising the steps of disposing at a preselected location within said containment first vessel a hygroscopic chemical substance capable of absorbing said liberated fluids, such chemical substance being normally isolated from the normal atmosphere within said reactor containment first vessel, and exposing the chemical substance to the reactor containment first vessel atmosphere substantially simultaneously with a change in condition of said atmosphere occasioned by the liberation of said fluids therein, whereby said liberated fluids are absorbed by said hygroscopic chemical substance and are removed from the reactor containment first vessel atmosphere.

2. The method of claim 1 wherein the hygroscopic chemical, also possessed of endothermic properties, is selected from the group consisting of potassium bromide, potassium thiocyanate, sodium chromate, sodium sulfide, and strontium hydroxide.

3. The method of claim 1 wherein the hygroscopic chemical is present in an amount sufficient to absorb the maximum quantity of fluid carrying radioactivated material possible of liberation into said reactor containment first vessel.

4. The method of claim 1 wherein the hygroscopic chemical additionally is deliquescent and the fluid involved is water vapor.

5. The method of claim 4 wherein the deliquescent chemical substance is selected from the group consisting of cyanoethanoic acid; trichloroacetic acid; 1,3,5-benzenetrisulfonic acid; and p-chloro-benzenesulfonic acid.

6. The method of claim 4 wherein the deliquescent chemical is present in an amount sufficient to absorb the maximum quantity of water vapor carrying radioactivated material possible of liberation into said reactor containment first vessel.

7. The method of claim 4 wherein the deliquescent chemical substance following liquefaction upon absorption of water vapor is transferred from said reactor containment first vessel to a recovery system for removal of water and reactivation of said deliquescent chemical substance.

8. In a nuclear reactor device the combination of a containment vessel; a pressure vessel encasing a reactor core mounted in said containment vessel; a steam-producing means associated with said pressure vessel in said containment vessel; a primary loop means the contents of which comprise a fluid carrying radioactivated material disposed in said containment vessel and connected to said pressure vessel and said steam-producing means; a secondary loop means mounted in said containment vessel and connected to said steam-producing means; and means for preventing the build-up of excess pressures in said containment vessel as the result of accidental liberation of at least part of the fluid of the primary loop means and for containing said liberated fluid within the containment vessel, said last-mentioned means comprising a reservoir of a hygroscopic chemical substance disposed at a preselected location within said containment vessel and normally isolated from the inner atmosphere of said containment vessel, said substance being present in an amount sufficient to absorb the said liberated fluid of the primary loop means and removable seal means for said hygroscopic chemical substance, said seal means being substantially immediately responsive to the liberation of the said fluid within said containment vessel for bringing said liberated fluid into intimate contact with the absorbing hygroscopic chemical substance.

9. In a nuclear reactor device the combination of a containment vessel; a pressure vessel encasing a reactor core mounted in the containment vessel; a steam-producing means associated with said pressure vessel in said containment vessel; a primary loop means the contents of which comprise a fluid carrying radioactivated materials connecting said pressure vessel with said steam-producing means; a secondary loop means connected to said steam-producing means; and means for preventing the build-up of excess pressures in the containment vessel as the result of accidental liberation of at least part of the fluid of the primary loop means and for containing said fluid within the containment vessel; said last-mentioned means comprising a reservoir of a hygroscopic chemical substance disposed within said containment vessel, destructible seal means normally isolating said chemical substance from the normal inner atmosphere of the containment vessel, said hygroscopic chemical substance being present in an amount sufficient to absorb the said fluid liberated from the primary loop means upon exposure thereto and said seal means being destructible under abnormal atmospheric conditions developing in the containment vessel with liberation of said fluid to expose the reservoir of the absorbing hygroscopic chemical substance to said liberated fluid.

References Cited in the file of this patent
UNITED STATES PATENTS

| 2,322,603 | Thumim et al. | June 22, 1943 |
| 2,841,545 | Zinn | July 1, 1958 |
| 3,022,238 | Kolflat | Feb. 20, 1962 |

OTHER REFERENCES

"Containment for the EBWR," A. H. Heineman and L. W. Fromm, Peaceful Uses of Atomic Energy, United Nations, 1958, vol. 11, pp. 139 ff.

"SL–1 Accident," A.E.C. Investigating Board Report, Joint Committee on Atomic Energy, Congress of the United States, 87th Congress, 1st session, June 1961.

UNITED STATES PATENT OFFICE
CERTIFICATE OF CORRECTION

Patent No. 3,158,546                          November 24, 1964

Roland Cordova

It is hereby certified that error appears in the above numbered patent requiring correction and that the said Letters Patent should read as corrected below.

Column 1, line 16, for "of", second occurrence, read -- or --; column 4, line 36, for "causes" read -- cause --; column 5, line 32, for "deisolation" read -- deisolated --.

Signed and sealed this 28th day of September 1965.

(SEAL)
Attest:

ERNEST W. SWIDER                              EDWARD J. BRENNER
Attesting Officer                                    Commissioner of Patents